United States Patent [19]
Nakajima et al.

[11] Patent Number: 5,911,099
[45] Date of Patent: Jun. 8, 1999

[54] ELECTROCONDUCTIIVE MEMBER AND ELECTROPHOTOGRPAHIC APPARATUS

[75] Inventors: Tadashi Nakajima, Tokyo; Junji Sakata, Fujisawa; Takahiro Kawagoe, Tokorozawa, all of Japan

[73] Assignee: Bridgestone Corporation, Tokyo, Japan

[21] Appl. No.: 08/960,313

[22] Filed: Oct. 29, 1997

[30] Foreign Application Priority Data

Dec. 16, 1996 [JP] Japan ..................................... 8-335394
May 28, 1997 [JP] Japan ..................................... 9-138321

[51] Int. Cl.⁶ ........................... G03G 15/06; G03G 15/14
[52] U.S. Cl. ........................... 399/286; 399/313; 492/56; 430/126
[58] Field of Search ..................................... 399/286, 313, 399/279, 411; 492/56, 59; 430/33, 120, 126

[56] References Cited

U.S. PATENT DOCUMENTS 4,062,812  12/1977  Safford et al. .
5,011,739   4/1991  Nielsen et al. .
5,250,357  10/1993  Wilson et al. .
5,386,279   1/1995  Fukami et al. ......................... 492/56 X
5,434,653   7/1995  Takizawa et al. .
5,541,001   7/1996  Vreeland et al. .
5,600,422   2/1997  Fukami et al. .......................... 399/313
5,659,857   8/1997  Yamazaki et al. ....................... 399/252
5,697,027  12/1997  Takagi et al. .......................... 399/279

*Primary Examiner*—Richard Moses
*Attorney, Agent, or Firm*—Oblon, Spivak, McClelland, Maier & Neustadt, P.C.

[57] ABSTRACT

There are disclosed an electroconductive member comprising a high-molecular material, e.g. polyurethane as a matrix and a quaternary ammonium salt of an organic acid, e.g. bis-or-mono(quaternary ammonium) oxalate; and an electrophotographic apparatus which makes use of the electroconductive member, especially in the form of an electroconductive roller as a developing member, image transfer member, etc. The electroconductive member, when used in electrophotographic mechanism, minimizes an increase in electric resistance at the time of normal continuous passage of an electric current and also variation range in the electric resistance between the circumstances of low temperature/humidity and those of high temperature/humidity.

12 Claims, 1 Drawing Sheet

ELECTROCONDUCTIIVE MEMBER AND ELECTROPHOTOGRPAHIC APPARATUS

BACKGROUND OF THE INVENTION

1. Field of the Invention

The present invention relates to an electroconductive member and an electrophotographic apparatus. More particularly, it pertains to an electroconductive member imparted with an antistatic function such as a packaging member or a shock-absorbing member, or a developing member and image transfer member that are employed in an electrophotographic mechanism, and to an electrophotographic apparatus using said electroconductive member.

2. Description of the Related Arts

With the advance of electronic technique, eager and increasing demands have recently been imposed on an electroconductive member in which an antistatic function is required for the purpose of protecting electronic part items and which is exemplified by a packaging member, a shock-absorbing member and members utilized in an electrophotographic apparatus such as a laser printer and a dry type copying machine. Among the electroconductive members, intensive attention has been paid to an elastic roller having an intermediate electric-resistance to be used in such a process as development and image transfer.

The electroconductive member to be used for such a purpose of use has heretofore been prepared from a high molecular material (including the foam therefrom) such as rubber and polyurethane that are regulated to a prescribed electric-resistance by mixing therein a powder or whisker of a metal or a metal oxide and/or a filler such as carbon black. The performance required for the above-mentioned electroconductive member include not only a prescribed electric-resistance of $1\times10^4$ to $1\times10^{12}$ $\Omega$ in the intermediate resistance region but also less variation range in the electric resistance between the circumstances of low temperature and low humidity and those of high temperature and high humidity.

However, the problems still remain unsolved in that it is difficult to regulate the electric resistance of an electroconductive member at a constant level by mixing therein carbon black or the like and also that the electroconductive member comprising a high molecular material regulated to a prescribed electric-resistance by mixing therein a powder or whisker of a metal or a metal oxide and/or a filler such as carbon black, suffers great positional dispersion of electric resistance as well as remarkable dependence of electric resistance upon voltage.

In such circumstances, there is produced an electroconductive member which is substantially freed from dispersion in electric resistance or dependence thereof on voltage in the intermediate resistance region by mixing therein an tonically electroconductive substance such as sodium perchlorate.

Nevertheless, a roller made of such an electroconductive member involves the problems of much variation range in the electric resistance between the circumstances of high temperature and high humidity such as 32.5° C./85% R.H. and those of low temperature and low humidity such as 15° C./10% R.H.; gradual increase in its electric resistance with continuous running under the condition of electric current passage; and the occurrence of poor image in the case of the roller being used for electrophotography.

SUMMARY OF THE INVENTION

The present invention has been accomplished in the light of the above-mentioned circumstances. Thus, it is an object of the present invention to provide an electroconductive member to be used in electrophotographic mechanism, etc. which member is minimized in an increase in electric resistance at the time of normal continuous passage of an electric current, and also minimized in variation range in the electric resistance between the circumstances of low temperature and low humidity and those of high temperature and high humidity; and at the same time to provide an electrophotographic apparatus using said electroconductive member.

Specifically, the electroconductive member as a first aspect of the present invention is characterized in that a quaternary ammonium salt of an organic acid is added to a matrix comprising a high molecular material.

The electroconductive member as a second aspect of the present invention is characterized in that said high molecular material is polyurethane.

The electroconductive member as a third aspect of the present invention is characterized in that said organic acid is a carboxylic acid.

The electroconductive member as a fourth aspect of the present invention is characterized in that said organic acid is maleic acid, oxalic acid, malonic acid, phthalic acid or terephthalic acid.

The electoconductive member as a fifth aspect of the present invention is characterized in that said quaternary ammonium salt of said organic acid is added in an amount of 0.001 to 20 parts by weight to 100 parts by weight of said high molecular material.

The electrophotographic apparatus as a sixth aspect of the present invention is characterized in that said apparatus comprises a developing device in which the electroconductive member as set forth in any of the above-mentioned first to fifth aspects of the present invention under the condition of supporting a developing agent thereon is brought into contact with or brought close to an image-forming body and is rotated to adhesively bond said developing agent to the surface of said body and to form a visible image on the surface of said body.

The electrophotographic apparatus as a seventh aspect of the present invention is characterized in that said apparatus comprises an image transfer device in which the electroconductive member as set forth in any of the aforestated first to fifth aspects of the present invention is made to electrically charge a recording medium, and thus a developing agent is transferred to the recording medium from the surface of an electrostatic latent image which has been made visible by said agent.

Figure 1:
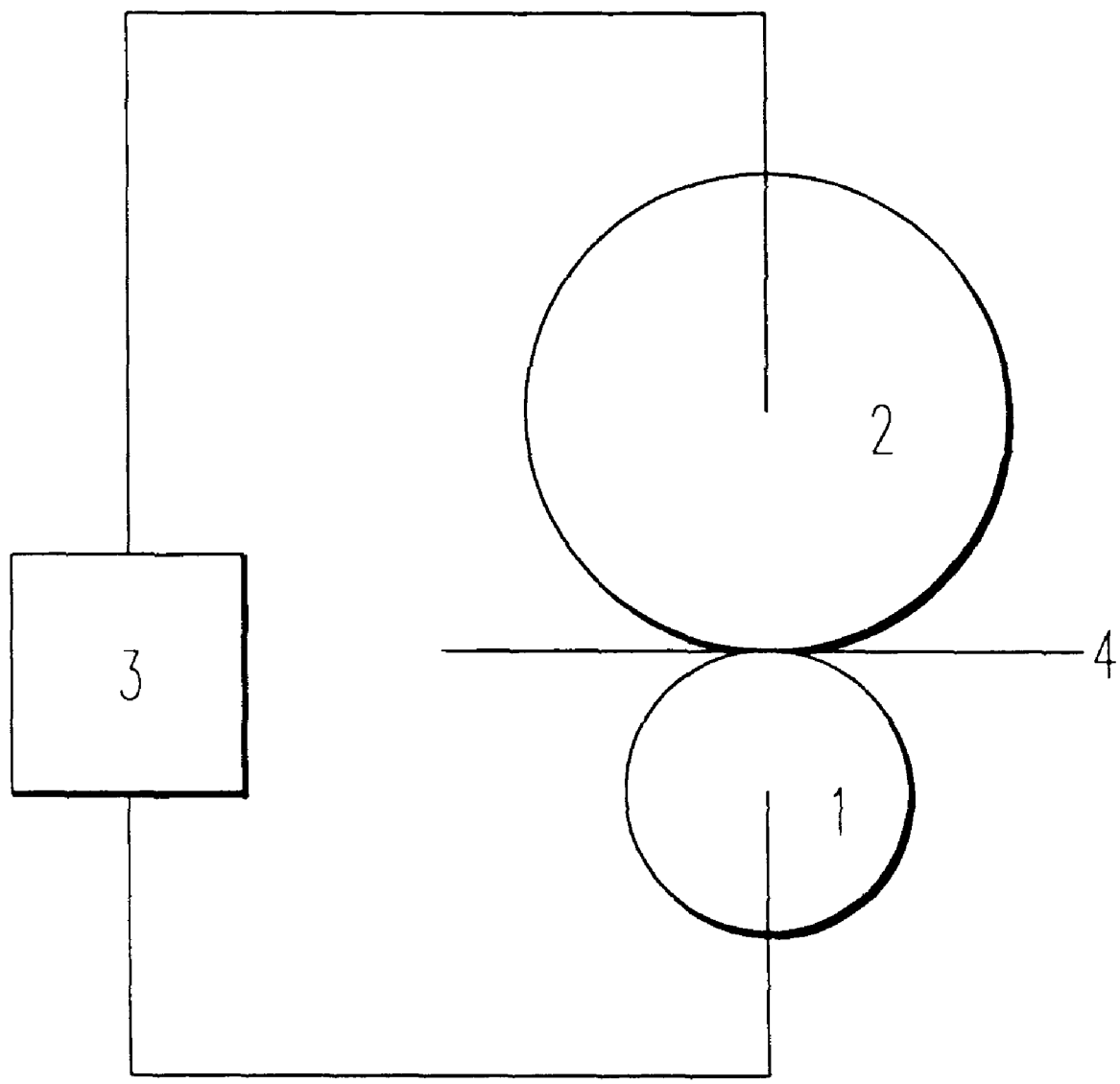
FIG. 1 is a schematic illustration showing an example of an electrophotographic apparatus in which the symbols 1 to 4 are described as follows.

1: electroconductive roller
2: photoreceptor
3: electric power source
4: recording medium

DESCRIPTION OF THE PREFERRED EMBODIMENTS

As a result of intensive research and investigation accumulated by the present inventors, it has been found that an electroconductive member is obtained which has electric resistance of $1\times10^4$ to $1\times10^{12}$ $\Omega$ under a measured voltage in the range of 10 to 5000 V, is minimized in the positional dispersion of electric resistance, is lessened in the temperature dependence of the electric resistance upon voltage in the range of 10 to 5000 volts, is minimized in variation in the electric resistance between 15° C./10% R.H. and 32.5° C./85% R.H. and has stable electric resistance at the time of continuous passage of an electric current by incorporating an ammonium salt of an organic acid in an amount of 0.001 to 20, preferably 0.01 to 1 parts by weight in 100 parts by weight of a matrix comprising a high molecular material to form the electroconductive member. The present invention has been accomplished on the basis of the foregoing finding and information.

In the following, more detailed description will be given of the present invention.

The electroconductive member relating to the first aspect of the present invention is characterized in that a quaternary ammonium salt of an organic acid is added to a matrix comprising a high molecular material.

The high molecular material to be used as the matrix is not specifically limited, but is preferably that containing a structural unit having polarity. Examples thereof include polyurethane containing a hydrophilic polyol as a structural unit, such as polyether polyol, polyester polyol and polytetramethylene glycol; urethane rubber (kneading type polyurethane); epichlorohydrin rubber; and polar rubber such as NBR. The above-exemplified high molecular material may be blended with a hydrophobic high molecular material such as polyisoprene, polybutadiene and hydrogenated polybutadiene to the extent that such blending does not impair the effect or performance of the present invention.

The process for producing the polyurethane relating to the present invention is not specifically limited, but there is preferably employed a process in which a hydrophilic chain extender and a crosslinking agent are mixed with a quaternary ammonium salt of an organic acid to be added for imparting electroconductivity, a reinforcing coloring agent such as carbon black, a crosslinking reaction catalyst and the like and thereafter the resultant mixture is cured by heating, said chain extender being exemplified by polyether polyol, polyester polyol, polytetramethylene glycol, a polyol formed by the addition polymerization of polyethylene oxide or polypropylene oxide onto glycerol, ethylene glycol, propanediol and butanediol, said crosslinking agent being exemplified by tolylene diisocyanate (TDI), diphenylmethane diisocyanate (MDI), a hydrogenated product therefrom, crude diphenylmethane diisocyanate (crude MDI), a hydrogenated product therefrom, hexamethylene diisocyanate and isophorone diisocyanate. There is also preferably employed a process in which any of the aforesaid polyol is isocyanated in advance, and the isocyanated polyol is cured by the use of the chain extender such as ethylene glycol, propylene glycol, 1,4-butanediol and trimethylolpropane.

It is also preferable to form the polyurethane into a foam. The foaming method in the case of foaming is not particularly limited, but there are preferably employed a method for foaming by the use of a foaming agent and a method for foaming by intermixing bubbles through mechanical agitation.

The process for producing the polar rubber relating to the present invention is not particularly limited, but there is employed a well-known process in which a polar rubber such as NBR and urethane rubber (kneading type polyurethane) is kneaded with some blending chemicals including a quaternary ammonium salt of an organic acid to be added for imparting electroconductivity, a crosslinking agent such as sulfur and dicumyl peroxide, a vulcanizing aid such as zinc oxide, a vulcanizing accelerator such as a benzothiazole derivative, an antioxidant such as various amines and a foaming agent such as oxybis(benzenesulfonyl hydrazide), by using a Banbury mixer, kneader, etc., and the resultant kneaded mixture is crosslinked by heating, electron beam or the like.

Thus it is made possible to regulate the electric resistance of the resultant product to an intermediate region of $1\times10^4$ to $1\times10^{12}$ Ω by intermixing the quaternary ammonium salt of the organic acid in the aforesaid high molecular material.

In addition, it was found in 1993 by the present inventors that an electroconductive member is obtained which is stabilized in electric resistance at $1\times10^4$ to $1\times10^{12}$ Ω even during a long time of electric current passage by adding 0.001 to 5, preferably 0.05 to 1 parts by weight of a quaternary ammonium salt to 100 parts by weight of a high molecular material such as polyurethane, said salt being used to take the place of an ionically electroconductive substance such as lithium perchlorate, sodium perchlorate and potassium perchlorate and being exemplified by lauryltrimethylammonium chloride, stearyltrimethylammonium chloride, octadecyltrimethylammonium chloride, dodecyltrimethylammonium chloride, hexadecyltrimethylammonium chloride, modified aliphatic dimethylethylammonium ethosulfate, tetraethylammonium perchlorate, tetrabutylammonium perchlorate, tetrabutylammonium borofluoride, tetraethylammonium borofluoride and tetrabutylammonium chloride (Refer to Japanese Patent Application Laid-Open No. 113050/1995 (Heisei 7)). However, such an electroconductive member has suffered a disadvantage of large variation in electric resistance between the circumstances of low temperature and low humidity at 15° C./10% R.H. and those of high temperature and high humidity at 32.5° C./85% R.H.

In view of the foregoing, further research and development was continued by the present inventors with regard to the combination of positive ions and negative ions. As a result, it has been found that the aforestated problem can be solved by adopting a quaternary ammonium as a positive ion and an organic acid as a negative ion.

The quaternary ammonium salt of an organic acid may be selected properly according to the situation from a variety of available such salts, and is exemplified by the compound represented by the general formula (I)

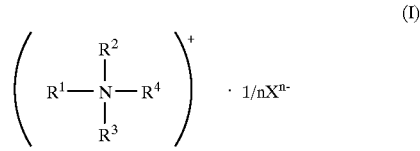

(I)

wherein $R^1$ is an alkyl group having 1 to 30 carbon atoms, an aryl group having 6 to 30 carbon atoms or an aralkyl group having 7 to 30 carbon atoms; $R^2$, $R^3$ and $R^4$ are each indendently of one another an alkyl group having 1 to 6 carbon atoms; $X^{n-}$ is an n valent organic acid ion; and n is an integer from 1 to 6.

The alkyl group having 1 to 30 carbon atoms in $R^1$ in the general formula (I) may be of straight chain, branched or cyclic and is exemplified by methyl group, ethyl group, propyl group, butyl group, hexyl group, octyl group, nonyl group, decyl group, dodecyl group, tetradecyl group, hexadecyl group, octadecyl group, eicosyl group, cyclopentyl group, cyclohexyl group, cyclooctyl group and cyclododecyl group. The aryl group having 6 to 30 carbon atoms in $R^1$ is exemplified by phenyl group and naphthyl group. The aralkyl group having 7 to 30 carbon atoms is exemplified by benzyl group, phenethyl group and nephthylmethyl group. The above-mentioned aryl group and aralkyl group may have a suitable inactive group introduced onto the carbon ring, including a lower alkyl group, a lower alkoxy group and a halogen.

The alkyl group having 1 to 6 carbon atoms which is represented by any of $R^2$, $R^3$ and $R^4$ may be of straight chain, branched or cyclic, and is exemplified by methyl group, ethyl group, propyl group, butyl group, pentyl group, hexyl group, cyclopentyl group, and cyclohexyl group, $R^2$, $R^3$ and $R^4$ may be the same as or differnet from one another.

Examples of the n valent organic acid ion as $X^{n-1}$ include acetate ion ($CH_3COO^-$), oxalate ion, malonate ion, malate ion, succinate ion, tartarate ion, maleate ion, fumarate ion, benzoate ion, phthalate ion, isophthalate ion, terephthalate ion, trimellitate ion, trimesate ion and tricarballyl ate ion.

Examples of the quaternary ammonium salt represented by the foregoing general formula (I) include a salt of a quaternary ammonium and an organic acid, said quaternary ammonium being exemplified by tetraethylammonium, tetrabutylammonium, benzyltrimethylammonium, dodecyltrimethylammonium (e.g. lauryltrimethylammonium), hexadecyltrimethylammonium, octadecyltrimethylammonium (e.g. stearyltrimethylammonium) and modified aliphatic dimethylethylammonium, said organic acid being exemplified by acetic acid, oxalic acid, malonic acid, malic acid, succinic acid, tartaric acid, maleic acid, fumaric acid, benzoic acid, phthalic acid, isophthalic acid, terephthalic acid, trimellitic acid, trimesic acid and tricarballylic acid.

As preferable examples of the quaternary ammonium salt of the organic acid according to the present invention, mention may be made of bis(quaternary ammonium) salt of oxalic acid represented by the general formula (IA)

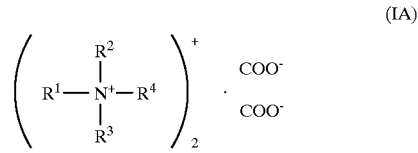

(IA)

wherein $R^1$ to $R^4$ are each as previously defined, and of mono(quaternary ammonium) salt of oxalic acid represented by the general formula (IB)

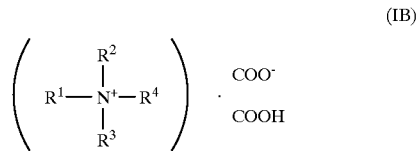

(IB)

wherein $R^1$ to $R^4$ are each as previously defined.

Examples of the bis(quaternary ammonium) salt represented by the general formula (IA) preferably include bis(benzyltrimethylammonium) oxalate, bis(benzyltriethylammonium) oxalate, bis(tetrabutylammonium) oxalate, bis(tetrapropylammonium) oxalate, bis(tetraethylammonium) oxalate and bis(tetramethylammonium) oxalate. Of these, bis(benzyltrimethylammonium) oxalate is particularly suitable.

On the other hand, examples of the mono(quaternary ammonium) salt represented by the general formula (IB) preferably include mono(benzyltrimethylammonium) oxalate, mono(benzyltriethylammonium) oxalate, mono(tetrabutylammonium) oxalate, mono(tetrapropylammonium) oxalate, mono(tetraethylammonium) oxalate and mono(tetramethylammonium) oxalate. Of these, mono(benzyltrimethylammonium) oxalate is particularly suitable.

It has been found by the present inventors that the stability of electric resistance against various circumstances can be reconciled with the stability of electric resistance at the time of continuous passage of an electric current by making use of the above-described quaternary ammonium salt as an electroconductive member. The present invention is based on such a finding.

The effect and performance of the quaternary ammonium salt of the organic acid remain unchanged whether a quaternary ammonium hydroxide such as a solution of tetrabutylammonium hydroxide in methanol and an organic acid such as phthalic aid are added separately from each other to the matrix comprising a high molecular material, or a quaternary ammonium salt such as benzyltrimethylammonium maleate in the form of salt is added thereto.

It is also preferable to use the aforestated quaternary ammonium salt in the form of a solution thereof in a solvent such as an ether, alcohol, ester, lactone and carbonate. Of the organic acids, carboxylic acids are preferably used which are exemplified by acetic acid, oxalic acid, malonic acid, malic acid, succinic acid, tartaric acid, maleic acid, fumaric acid, benzoic acid, phthalic acid, isophthalic acid, terephthalic, trimellitic acid, trimesic acid and tricarballylic acid. Of these, polybasic acids such as phthalic acid, terephthalic acid, oxalic acid, malonic acid and maleic acid are particularly preferable.

The quaternary ammonium salt may be used in combination with a filler or salt which has heretofore been used, including an inorganic salt such as lithium perchlorate, potassium perchlorate, sodium perchlorate and calcium perchlorate and an electroconductive filler such as carbon black, metallic powder and metal oxide powder to the extent that the effect or performance of the invention is not impaired.

An electroconductive roller which is the major utilization sphere of the electroconductive member according to the present invention, is usually made of a plated steel, or a core metal of stainless steel, etc. coated with an electroconductive member of the present invention. Depending upon the purpose of use, the aforesaid roller may be coated outside with an electroconductive and/or semi-electroconductive and/or insulating coating material so that the coated roller shows a stable electric resistance in an intermediate region of $1 \times 10^4$ to $1 \times 10^{12}$ Ω.

In the following, some description will be given of an example of an image transfer apparatus using the electroconductive member of the present invention with reference to FIG. 1. An electroconductive roller (e.g. an image transfer roller) 1 equipped with a core metal (not shown) is allowed to abut against a photoreceptor 2 via a recording medium 4 such as a sheet of paper, and voltage is applied between the electroconductive roller 1 and the photoreceptor 2 from an electric power source 3 to generate an electric field between the photoreceptor and the recording medium, whereby a developing agent such as a toner on the photoreceptor 2 is transferred onto the recording medium. In the case of incorporating the electroconductive member of the present invention in an electrophotographic apparatus such as a copying machine, the member is used in a developing device, a copying device and the like, especially an electrostatic image developing portion, a transfer portion for a developing agent such as a tonner and the like portions.

In the case of using an electroconductive roller made up of the conventional electroconductive material comprising a high molecular material such as polyurethane incorporated with a salt being an tonically electroconductive substance such as lithium perchlorate, sodium perchlorate and calcium perchlorate, prescribed voltage was impressed with the electric power source 3. However when the roller was continuously operated while being kept at a same polarity and potential, the electric resistance of the roller increased with the lapse of operating time, thus forcing a considerably high potential to be applied at the time of passing a prescribed electric current therethrough. Finally, the roller operation sometimes resulted in failure to assure a predetermined amount of electric current. It is thought that the mechanism concerned with increase in the electric resistance is due to the occurrence of dissociation and polarization of the salt such as lithium perchlorate, sodium perchlorate, calcium perchlorate and lithium borofluoride each being added to manifest electroconductivity, whereby an electric current is less prone to pass through the roller.

As described hereinbefore, the electroconductive roller employing the electroconductive member according to the present invention is improved in variation in electric resistance with circumstances and suppressed in an increase in electric resistance even at the time of continuous operation. The roller, when applied to an electrophotographic process, makes it possible to obtain a stable favorable image even at the time of a long-term continuous operation.

In the following, the present invention will be described in more detail with reference to comparative examples and working examples, which however shall not limit the present invention thereto.

EXAMPLE 1

Polyether polyol with a molecular weight of 3500 in an amount of 100 parts by weight having an ethylene oxide unit content of 12% which had been produced by randomly adding propylene oxide and ethylene oxide to glycerol; 6.05 parts by weight of butanediol; 22 parts by weight of tolylene diisocyanate; 4 parts by weight of reactive silicone-based surfactant; 0.01 part by weight of dibutyltin dilaurate; and 0.1 part by weight of tetrabutylammonium phthalate were mixed with a mixer. By the use of the resultant mixture, an image transfer roller was produced in which a metallic shaft core with a diameter of 6 mm was placed in the center and longitudinally covered with polyurethane foam to attain a diameter of 16.5 mm and a length of 215 mm.

Subsequently, the transfer roller was placed on an aluminum plate with a thickness of 5 mm, and a measurement was made of the electric resistance of the foam between the metallic core and a copper plate of a resistance measuring instrument under the environmental conditions of 20° C. and 50% R.H., while both the ends of the roller were compressed at a force of 500 g, respectively. As a result, the electric resistance thereof was $5.9 \times 10^8$ Ω under 20° C./50% R.H. at an applied voltage of 1000 V; $2.8 \times 10^7$ Ω under 32.5° C./85% R.H. at an applied voltage of 1000 V; and $9.1 \times 10^9$ Ω under 15° C./10% R.H. at an applied voltage of 1000 V.

Further, the roller was incorporated in an electrophotographic apparatus as shown in FIG. 1. Thus, the apparatus was made to print a grey scale, a black solid with 100 dot percent and a white solid with zero dot percent under the environmental conditions of 15° C. and 10% R.H. As a result, favorable images were obtained. In addition, the apparatus was made to print a grey scale, a black solid with 100 dot percent and a white solid with zero dot percent under the environmental conditions of 32.5° C. and 85% R.H. As a result, favorable images were obtained.

Subsequently, the photoreceptor of the appratus was replaced with an aluminum raw pipe. The roller was continuously rotated for 150 hours under the environmental conditions of 20° C. and 50% R.H., while voltage of 1000 V was applied thereto throughout the rotation. Thereafter, a measurement was made of the electric resistance of the polyurethane foam in the same manner as the foregoing. As a result the electric resistance thereof was $7.3 \times 10^8$ Ω under 20° C./50% R.H., $2.5 \times 10^7$ Ω under 32.5° C./85% R.H. and $1.1 \times 10^{10}$ Ω under 15° C./10% R.H.

Then, the roller was incorporated in the electrophotographic apparatus in the same manner as before. Thus the apparatus was made to print a grey scale, a black solid with 100 dot percent and a white solid with zero dot percent under 15° C./10% R.H. As a result, favorable images were obtained.

COMPARATIVE EXAMPLE 1

The procedure in Example 1 was repeated to proceed with the experimental test except that 0.05 part by weight of sodium perchlorate was used as an ionically electroconductive material in place of 0.1 part by weight of the tetrabutylammonium phthalate. As a result, the initial electric resistance of the roller was $3.0 \times 10^8$ Ω under 20° C./50% R.H., $2.8 \times 10^7$ Ω under 32.5° C./85% R.H., and $2.7 \times 10^9$ Ω under 15° C./10% R.H. The resultant image was favorably evaluated. However, after the continuous test on electric current passage carried out in the same manner as in Example 1, the electric resistance thereof became $7.0 \times 10^9$ Ω under 20° C./50% R.H., $6.1 \times 10^7$ Ω under 32.5° C./85% R.H., and $7.2 \times 10^{11}$ Ω under 15° C./10% R.H. Then the electrophotographic apparatus was made to print a black solid with 100 dot percent under 15° C./10% R.H. As a result, poor images were obtained in which white lines appeared.

EXAMPLE 2

The procedure in Example 1 was repeated to proceed with the experimental test except that 0.1 part by weight of benzyltrimethylammonium maleate was used as an tonically electroconductive material in place of 0.1 part by weight of the tetrabutylammonium phthalate. As a result, the initial electric resistance of the roller was $5.1 \times 10^8$ Ω under 20° C./50% R.H., $4.8 \times 10^7$ Ω under 32.5° C./85% R.H., and $8.7 \times 10^9$ Ω under 15° C./10% R.H. The resultant image was favorably evaluated. Moreover, after the continuous test on electric current passage carried out in the same manner as in Example 1, the electric resistance thereof was $6.3 \times 10^8$ Ω under 20° C./50% R.H., $2.7 \times 10^7$ Ω under 32.5° C./85% R.H., and $9.1 \times 10^9$ Ω under 15° C./10% R.H. Then the electrophotographic apparatus was made to print a black solid with 100 dot percent. As a result, favorable images were obtained.

EXAMPLE 3

Polyether polyol with a molecular weight of 5000 in an amount of 80 parts by wight which had been produced by randomly adding propylene oxide and ethylene oxide to glycerol; 20 parts by weight of polytetramethylene ether glycol with a molecular weight of 1000; 14.5 parts by weight of carbodiimide-modified diphenylmethane diisocyanate; 4 parts by weight of reactive silicone-based surfactant; 0.02 parts by weight of dibutyltin dilaurate; and 0.3 part by weight of benzyltrimethylammonium oxalate were mixed with a mixer. By the use of the resultant mixture, an image transfer roller was produced in which a metallic shaft core with a diameter of 6 mm was placed in the center and longitudinally covered with polyurethane foam to attain a diameter of 16.5 mm and a length of 215 mm.

Subsequently, the transfer roller was placed on an aluminum plate with a thickness of 5 mm, and a measurement was made of the electric resistance of the foam between the metallic core and a copper plate of a resistance measuring instrument under the environmental conditions of 20° C. and 50% R.H., while both the ends of the roller were compressed at a force of 500 g, respectively. As a result, the electric resistance thereof was $2.0 \times 10^8$ Ω under 20° C./50% R.H. at an applied voltage of 1000 V; $5.2 \times 10^7$ Ω under 32.5° C./85% R.H. at an applied voltage of 1000 V; and $1.7 \times 10^9$ Ω under 15° C./10% R.H. at an applied voltage of 1000 V.

Further, the roller was incorporated in an electrophotographic apparatus as shown in FIG. 1. Thus, the apparatus was made to print a grey scale, a black solid with 100 dot percent and a white solid with zero dot percent under the environmental conditions of 15° C. and 10% R.H. As a result, favorable images were obtained. In addition, the apparatus was made to print a grey scale, a black solid with 100 dot percent and a white solid with zero dot percent under the environmental conditions of 32.5° C. and 85% R.H. As a result, favorable images were obtained.

Subsequently, the photoreceptor of the apparatus was replaced with an aluminum raw pipe. The roller was continuously rotated for 150 hours under the environmental conditions of 20° C. and 50% R.H., while voltage of 1000 V was applied thereto throughout the rotation. Thereafter, a measurement was made of the electric resistance of the polyurethane foam in the same manner as the foregoing. As a result the electric resistance thereof was $2.0 \times 10^8$ Ω under 20° C./50% R.H., $5.2 \times 10^7$ Ω under 32.5° C./85% R.H., and $1.8 \times 10^{10}$ Ω under 15° C./10% R.H.

Then, the roller was incorporated in the electrophotographic apparatus in the same manner as before. Thus the apparatus was made to print a grey scale, a black solid with 100 dot percent and a white solid with zero dot percent under 15° C./10% R.H. and under 32.5° C./85% R.H. As a result favorable images were obtained.

EXAMPLE 4

The procedure in Example 3 was repeated to proceed with the experimental test except that 0.3 part by weight of benzyltrimethylammonium malonate was used as an tonically electroconductive material in place of 0.3 part by weight of the benzyltrimethylammonium oxalate. As a result, the initial electric resistance of the roller was $8.0 \times 10^7$ Ω under 20° C./50% R.H., $4.0 \times 10^7$ Ω under 32.5° C./85% R.H., and $1.8 \times 10^9$ Ω under 15° C./10% R.H. The resultant image was favorably evaluated. Moreover, after the continuous test on electric current passage carried out in the same manner as in Example 3, the electric resistance thereof was $8.0 \times 10^7$ Ω under 20° C./50% R.H., $4.0 \times 10^7$ Ω under 32.5° C./85% R.H., and $2.5 \times 10^9$ Ω under 15° C./10% R.H. Then the electrophotographic apparatus was made to print a black solid with 100 dot percent. As a result, favorable images were obtained.

EXAMPLE 5

The procedure in Example 1 was repeated to proceed with the experimental test except that 0.3 part by weight of benzyltrimethylammonium terephthalate was used as an tonically electroconductive material in place of 0.1 part by weight of the tetrebutylammonium phthalate. As a result, the initial electric resistance of the roller was $2.6 \times 10^8$ Ω under 20° C./50% R.H., $8.5 \times 10^6$ Ω under 32.5° C./85% R.H., and $3.3 \times 10^9$ Ω under 15° C./10% R.H. The resultant image was favorably evaluated. Moreover, after the continuous test on electric current passage carried out in the same manner as in Example 1, the electric resistance thereof was $1.7 \times 10^8$ Ω under 20° C./50% R.H., $5.2 \times 10^6$ Ω under 32.5° C./85% R.H., and $3.3 \times 10^9$ Ω under 15° C./10% R.H. Then the electrophotographic apparatus was made to print a black solid with 100 dot percent. As a result, favorable images were obtained.

EXAMPLE 6

(1) Preparation of bis(benzyltrimethylammonium) oxalate.

Oxalic acid in an amount of 10.78 g (0.120 mol) was dissolved in acetone, making a total of 100 g. The resultant solution was mixed with 100 g of 40% by weight solution of benzyltrimethylammonium hydroxide (0.261 mol) in methanol (produced by Tokyo Kasei Kogyo Co., Ltd.), and then 1500 g of acetone was added to the resultant mixture to form white precipitate. Subsequently, the precipitate was collected by means of suction filtration method, dispersed in 500 g of acetone and filtered to collect cake. The resultant cake was subjected to drying treatment under vacuum at 80° C. for 24 hours to form 33.9 g (0.0941 mol) of bis(benzyltrimethylammonium) oxalate at a yield of 78.4% based on the fed oxalic acid. The resultant bis(benzyltrimethylammonium) oxalate, in which a melting point was not recognized, was thermally decomposed in a stream of nitrogen at about 240° C.

Subsequently, a measurement was made of an increase in weight of the bis(benzyltrimethylammonium) oxalate due to moisture absorption under environmental conditions of 25° C. and 55% R.H. As a result, the weight of the same, which was initially 1.43 g increased to 1.51 g (105.6%) after 10 min., to 1.57 g (109.8%) after 30 min., to 1.67 g (116.8%) after 60 min. and to 1.74 g (121.7%) after 120 min.

(2) Evaluation of electroconductive member incorporated with bis(benzyltrimethylamonium) oxalate.

Polyether polyol with a molecular weight of 5000 in an amount of 80 parts by wight which had been produced by randomly adding propylene oxide and ethylene oxide to glycerol; 20 parts by weight of polytetramethylene ether glycol with a molecular weight of 1000; 16.4 parts by weight of carbodiimide-modified diphenylmethane diisocyanate; 4 parts by weight of reactive silicone-based surfactant; 0.01 part by weight of dibutyltin dilaurate; and 0.3 part by weight of the bis(benzylammonium) oxalate produced in the preceding procedure (1) were mixed by means of a mixer with air bubbles mixed thereinto to produce a polyurethane sponge sheet having 5.5 mm thickness and 120 mm square.

Thereafter, a measurement was made of the electric resistance of the resultant sheet at a voltage of 1000 V by the use of a measuring chamber (produced by Advantest Corporation, model "RT-42") and a high resistance meter (produced by Advantest Corporation, model "R8340A"). As a result, the electric resistance was $3.8 \times 10^9$ Ω under 15° C./10% R.H., $4.0 \times 10^8$ Ω under 20° C./50% R.H. and $4.1 \times 10^7$ Ω under 32.5° C./85% R.H.

Further, an electric current was continuously passed through the sheet for 50 hours at a voltage of 1000 V applied thereto throughout said period under the environmental conditions of 20° C./50% R.H. by the use of the measuring chamber (RT-42). Subsequently, a measurement was made of the electric resistance of the sheet in the same manner as the above. As a result, the electric resistance was $4.0 \times 10^9$ Ω under 15° C./10% R.H., $4.0 \times 10^8$ Ω under 20° C./50% R.H., and $4.0 \times 10^7$ Ω under 32.5° C./85% R.H.

EXAMPLE 7

(1) Preparation of mono(benzyltrimethylammonium) oxalate.

Oxalic acid in an amount of 21.56 g (0.239 mol) was dissolved in acetone, making a total of 100 g. The resultant solution was mixed with 100 g of 40% by weight solution of benzyltrimethylammonium hydroxide (0.261 mol) in methanol (produced by Tokyo Kasei Kogyo Co., Ltd.), and then 1500 g of acetone was added to the resultant mixture to form white precipitate. Subsequently, the precipitate was collected by means of suction filtration method, dispersed in 500 g of acetone and filtered to collect cake. The resultant cake was subjected to drying treatment under vacuum at 80° C. for 24 hours to form 46.80 g (0.208 mol) of mono(benzyltrimethylammonium) oxalate at a yield of 87.0% based on the fed oxalic acid. The resultant mono(benzyltrimethylammonium) oxalate, which had a melting point of about 130° C. in a stream of nitrogen, was thermally decomposed in a stream of nitrogen at about 230° C. with a latent heat of fusion of about 123 J/g.

(2) Evaluation of electroconductive member incorporated with mono(benzyltrimethylammonium) oxalate.

Polyether polyol with a molecular weight of 5000 in an amount of 80 parts by wight which had been produced by randomly adding propylene oxide and ethylene oxide to glycerol; 20 parts by weight of polytetramethylene ether glycol with a molecular weight of 1000; 16.6 parts by weight of carbodiimide-modified diphenylmethane diisocyanate; 4 parts by weight of reactive silicone-based surfactant; 0.01 part by weight of dibutyltin dilaurate; and 0.3 part by weight of the mono(benzylammonium) oxalate produced in the preceding procedure (1) were mixed by means of a mixer with air bubbles mixed thereinto to produce a polyurethane sponge sheet having 5.5 mm thickness and 120 mm square.

Thereafter, a measurement was made of the electric resistance of the resultant sheet at a voltage of 1000 V by the use of a measuring chamber (produced by Advantest Corporation, model "RT-42") and a high resistance meter (produced by Advantest Corporation, model "R8340A"). As a result, the electric resistance was $2.2 \times 10^9$ Ω under 15° C./10% R.H., $2.2 \times 10^8$ Ω under 20° C./50% R.H. and $2.3 \times 10^7$ Ω under 32.5° C./85% R.H.

What is claimed is:

1. An electroconductive member which comprises a polyurethane as a matrix and a quaternary ammonium salt of a carboxylic acid added thereto.

2. The electroconductive member according to claim 1, wherein the carboxylic acid is at least one member selected from the group consisting of maleic acid, oxalic acid, malonic acid, phthalic acid and terephthalic acid.

3. The electroconductive member according to claim 1, wherein the quaternary ammonium salt of a carboxylic acid is a compound represented by the general formula (I)

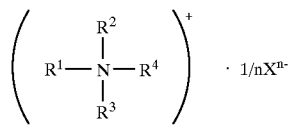

(I)

wherein $R^1$ is an alkyl group having 1 to 30 carbon atoms, an aryl group having 6 to 30 carbon atoms or an aralkyl group having 7 to 30 carbon atoms; $R^2$, $R^3$ and $R^4$ are each independently of one another an alkyl group having 1 to 6 carbon atoms; $X^{n-}$ is an n-valent carboxylic acid ion; and n is an integer from 1 to 6.

4. The electroconductive member according to claim 1, wherein the quaternary ammonium salt of a carboxylic acid is a bis(quaternary ammonium) oxalate represented by the general formula (IA)

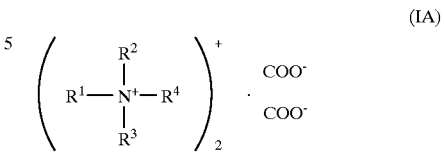

wherein $R^1$ to $R^4$ are each as previously defined, or a mono(quaternary ammonium) oxalate represented by the general formula (IB)

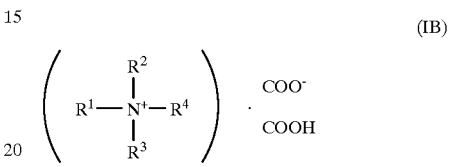

wherein $R^1$ to $R^4$ are each as previously defined.

5. The electroconductive member according to claim 1, wherein 0.001 to 20 parts by weight of said quaternary ammonium salt of a carboxylic acid is added to 100 parts by weight of said polyurethane material.

6. An electrophotographic apparatus which comprises a developing device in which the electroconductive member as set forth in claim 1 being under the condition of supporting a developing agent thereon is brought into contact with or brought close to an image-forming body and is rotated to adhesively bond said developing agent to the surface of said image-forming body and to form a visible image on the surface of said image-forming body.

7. An electrophotographic apparatus which comprises an image transfer device in which the electroconductive member as set forth in claim 1 is made to electrically charge a recording medium, and thus a developing agent is transferred to the recording medium from the surface of an electrostatic latent image which has been made visible by said developing agent.

8. An electro conductive member which comprises a high-molecular material as a matrix and a quaternary ammonium salt of a carboxylic acid added thereto.

9. The electroconductive member according to claim 8, wherein said carboxylic acid is at least one member selected from the group consisting of maleic acid, oxalic acid, malonic acid, phthalic acid and terephthalic acid.

10. The electroconductive member according to claim 8, wherein 0.001 to 20 parts by weight of said quaternary ammonium salt of a carboxylic acid is added to 100 parts by weight of said high-molecular material.

11. An electrophotographic apparatus which comprises a developing device in which the electroconductive member as set forth in claim 8 being under the condition of supporting a developing agent thereon is brought into contact with or brought close to an image-forming body and is rotated to adhesively bond said developing agent to the surface of said image-forming body and to form a visible image on the surface of said image-forming body.

12. An electrophotographic apparatus which comprises an image transfer device in which the electroconductive member as set forth in claim 8 is made to electrically charge a recording medium, and thus a developing agent is transferred to the recording medium from the surface of an electrostatic latent image which has been made visible by said developing agent.

* * * * *